INVENTOR
JOSEPH E. ANNIS

BY Robert R. Hubbard
ATTORNEY

INVENTOR
JOSEPH E. ANNIS
BY Robert R. Hubbard
ATTORNEY

3,551,900
INFORMATION STORAGE AND DECODER SYSTEM

Joseph E. Annis, Stoneham, Mass., assignor to RCA Corporation, a corporation of Delaware Filed Oct. 8, 1968, Ser. No. 765,773
Int. Cl. H03k 13/25, 17/62
U.S. Cl. 340—173 5 Claims

ABSTRACT OF THE DISCLOSURE

An information storage system having $n$ bits of storage and only $3n-2$ field effect switching devices connected in an $m$ level tree for selecting one only of the $n$ bits for readout. The numbers of devices in the $m$th and $m-1$th levels are both equal to $n$ and the number of devices per level increases by a factor of two from the first level through the $m-1$th level. The $m$th level devices are each responsive to a different bit of storage and the rest of the devices are responsive to an address signal for selecting one of the $n$ bits for readout.

BACKGROUND REFERENCE

A patent No. 3,355,598 to J. W. Tuska describes integrated circuit structures for field effect device tree arrangements which may be employed in the information storage system of the present invention.

BACKGROUND OF THE INVENTION

The present invention relates to information storage systems having relatively fast read or access times. In particular, the invention relates to a novel and improved technique for reading out a selected one of $n$ bits stored in an array of binary storage elements.

An information storage system generally includes, inter alia, an array of storage elements, an address decoder and a bit sensing arrangement. Two features of prior art memory systems are of interest to the present invention. First, the sensing arrangements of some prior art systems generally include two switching devices for each stored bit, one for sensing the binary value of the bit and the other for responding to one of the address decoder outputs.

Second, there are two principal circuit delays which occur between the instant that the access or address signal is applied to the address decoder and the instant that the selected bit is sensed by the sensing arrangement to thereby provide a utilizable or valid output signal. One of the circuit delays is associated with the turn-on or off of the switching device or devices included in the address decoder. The other delay is associated with the turn-on or off of a switching device or devices included in the sensing arrangement.

BRIEF SUMMARY OF INVENTION

An object of the present invention is to provide a novel and improved technique for reading out one of $n$ bits stored in an array of binary storage elements in such manner that only one circuit delay is involved.

Another object is to provide a storage system wherein the read-out portion requires, in addition to a decoder and a current or voltage sensor device, only one switching device for each stored bit of information.

Yet another object is to provide an information storage system which requires in addition to a current or voltage sensor device only $3n-2$ active devices for $n$ bits of storage.

In brief, apparatus embodying the invention employs $m$ levels of switching devices, each device having a current path and a control element for controlling the flow of current through the path. The number of devices per level increases by a factor of two from the first level through the $m-1$th level. The number of devices in the $m-1$th level and the mth level are identical. Branch circuit means includes a plurality of branch paths coupled between a common connector means and a sensing connector means. Each of the branch paths includes only one of the current paths of the devices in each level. Address connector means includes connections to each of the control elements of the devices in the first through the $m-1$th levels. Information connector means includes connections to the control elements of the $m$th level devices.

In one embodiment, the $m$th level devices have their control elements permanently connected to one or the other of two voltage levels, indicative of the two binary values, while in other embodiments the $m$th level devices have their control elements connected to sense the bit value of corresponding binary storage elements. In either case, the only circuit delay involved in read-out is associated with the turn-on or off of the decoding devices in the first through the $m-1$th levels.

DESCRIPTION OF PREFERRED EMBODIMENTS

Figures 1, 2:
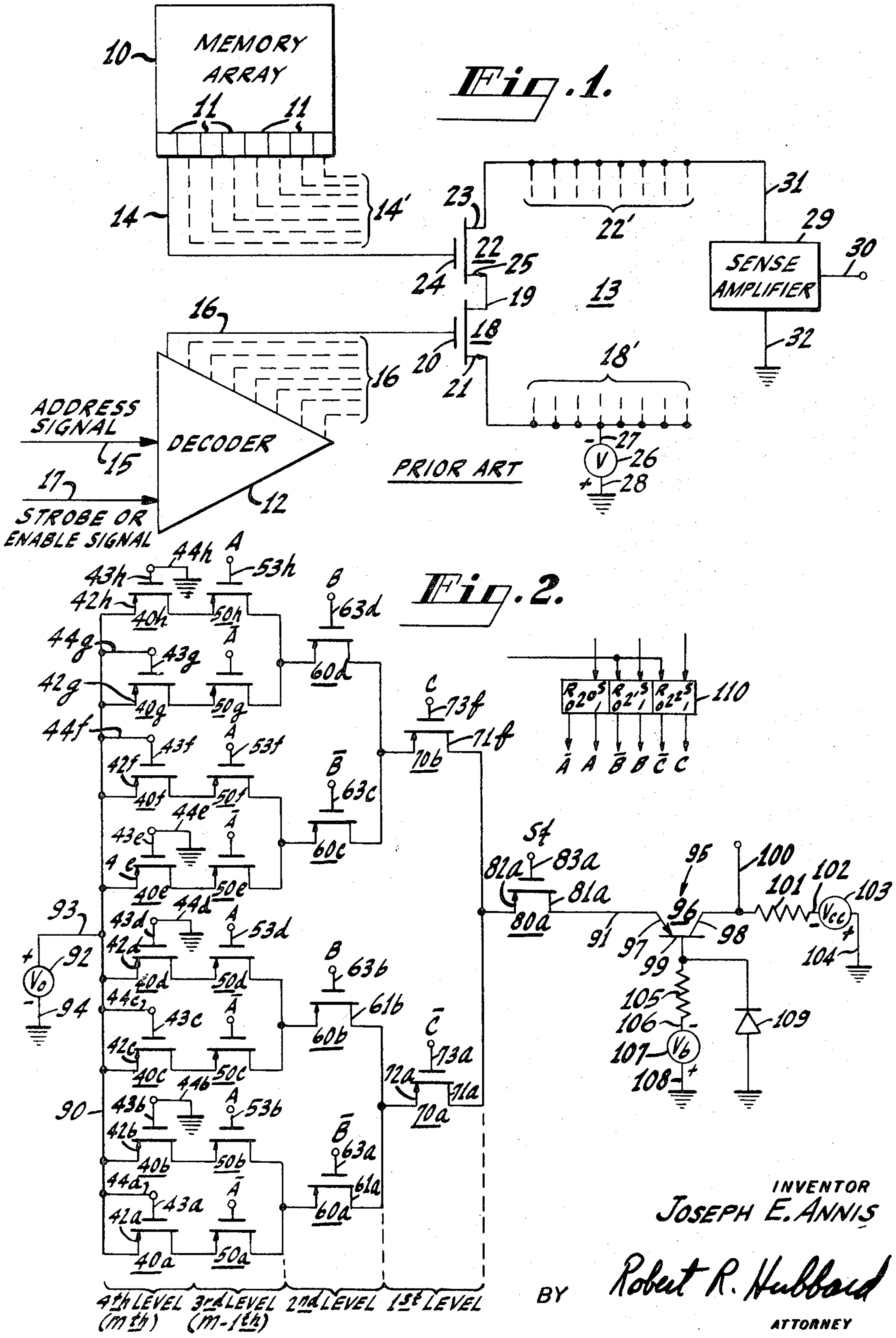
FIG. 1 is in part a block diagram and in part a circuit diagram of a prior art information storage system.
FIG. 2 is a circuit diagram of one embodiment of a memory system in accordance with the present invention.

The active devices contemplated for use in practicing the present invention include devices having a current or conduction path and a control element for controlling the current flow therethrough. As employed in the invention, the control element responds to one voltage level to provide a relatively high impedance in the current path and to another voltage level to provide a relatively low impedance in the current path. Active devices operative in this manner may include field-effect semiconductor devices, bipolar transistors, vacuum tubes, relays, and the like. However, by way of example and completeness of description, the preferred embodiments are illustrated with field-effect semiconductor devices of the enhancement type having control or gate electrodes which are insulated from their current or conduction paths.

An insulated gate field effect transistor (IGFET) may generally be defined as a majority carrier field-effect device which includes a body of semiconductor material. A carrier conduction channel or path within the semiconductive body is bound at one end thereof by a source region and at the other end thereof by a drain region. A gate or control electrode means overlies at least a portion of the carrier conduction channel and is separated therefrom by a region of insulating material. Due to the insulation between the gate electrode and the channel, the input impedance of the IGFET is very large, on the order of $10^{15}$ ohms or more, so that substantially no D-C current flows in the gate electrode circuit. Thus, the IGFET is a voltage controlled device. Signals are voltages applied to the gate electrode means to control, by field effect, the conductance of the channel.

Such transistors may be of either the enhancement type or the depletion type. In a depletion type transistor there is current flow through the conduction channel when the source and gate electrodes have the same voltage ($V_{gs}=0$). This current flow either increases or decreases depending upon the polarity of the applied voltage between the gate and source electrodes. In an enhancement type transistor there is substantially no current flow through the conduction channel until $V_{gs}$ is at least equal in magnitude to the threshold voltage $V_t$ and of the same polarity as the drain-to-source voltage ($V_{ds}$). As pointed out above, the enhancement IGFET is employed to illustrate the embodiments of the present invention.

An IGFET may be either a P-type or an N-type transistor depending upon the majority carriers involved in drain current conduction. Although information storage systems in accordance with the invention may employ either P or N units or a combination of P and N units, the preferred embodiments are illustrated with P-type units which are identified on the drawings by an arrowhead on the source lead pointing toward the unit.

Information storage systems embodying the invention may be constructed either with discrete components or by means of integrated circuit processes. As used herein, the term, integrated circuit, refers to those technologies by which an entire circuit can be formed as by diffusion or by thin film in or on one or more substrates (or chips) of materials, such as silicon, glass, sapphire, or the like. For example, in the case of metal oxide semiconductor (MOS) IGFETS, the substrate material could be a suitable semiconductor, such as silicon, while for the case of thin film IGFETS, the substrate material could be an insulator, such as glass or sapphire. In the description which follows, all IGFET devices will be assumed to be of the MOS variety and all semiconductor materias will be assumed to be silicon, unless otherwise specified.

Referring now to FIG. 1, a prior art information storage system is shown as including a memory array 10, an address decoder 12 and a bit sensing circuit 13. Included in the memory array 10 are a plurality of binary storage elements 11 of which only eight are shown. Each of the storage elements 11 has an output or bit sensing lead 14 or 14'. One lead, illustrated by a solid line 14, is associated with the leftmost storage element 11 and dashed lines 14' are associated respectively with the remainder of the illustrated storage elements.

The storage elements 11 may include any suitable storage devices, such as a pair of cross-coupled inverters which store bits of information. If the bit stored by an element 11 is of one binary value the output voltage on the associated sense lead is −V volts. If the stored bit is of the other binary value, the sense lead voltage level is 0 volt.

The decoder 12 includes a number of switching devices (not shown) which are responsive to a strobe or an enable signal at an input 17 and to an address signal at another input 15 to select one of eight decoder outputs 16 and 16' corresponding to the eight bit sensing leads 14 and 14'. For example, the decoder 12 could be comprised of P-MOS devices in a tree arrangement similar to the N-type IGFET tree in FIG. 1 of the previously mentioned Tuska patent. The solid lead 16 corresponds to the selection of the bit sensing lead 14 and the dashed selection leads 16' correspond to the selection of separate ones of the dashed bit sense leads 14'.

In the absence of a strobe or an enable signal at input 17 the decoder switching devices are turned off and each of the bit selection leads 16 and 16' is at a voltage level of −V volts. When the strobe or enable signal is applied to input 17 the decoder switching devices respond to the address signal at input 15 to provide a 0 volt level on one of the eight bit selection leads 16 and 16'. Thus, whenever a strobe signal is applied to decoder 12, there is a circuit delay associated with the turn-on of one or more of the decoder switching devices.

Each of the bit sensing leads 14 and 14' and each of the bit selection leads 16 and 16' are connected to the gate leads of separate N-MOS devices in the sensing circuit 13. For the sake of convenience, only the two N-MOS devices 18 and 22 having their gate leads 20 and 24 coupled to the solid sense and selection leads 16 and 14, respectively, are illustrated. The D-MOS devices 18 and

22 have their conduction paths connected in series with a voltage source 26 of suitable D.C. operating voltage and a sense amplifier 29. The positive lead 28 of the voltage source 26 is connected to a point of reference potential, illustrated as circuit ground by the conventional symbol therefor. The negative lead 27 of the source 26 is connected to the source lead 21 of P-MOS device 18. The device 18 has its drain lead 19 connected to the source lead 25 of N-MOS device 22. The device 22 has its drain lead 23 coupled to a lead 31 of the sense amplifier 29. Another lead 32 of the sense amplifier is connected to circuit ground. The sense amplifier 29 also has an output lead 30 at which an output signal is developed during read-out of the array 10.

The other N-MOS devices (not shown) associated with the dashed sense and selection leads 14' and 16' are designated collectively by reference characters 22' and 18', respectively, the dashed lines indicating that these other N-MOS devices are connected in circuit across N-MOS devices 18 and 22 to share voltage source 26 and sense amplifier 29.

The N-MOS device 18 (and also devices 18') is normally (in the absence of the docoder enabling signal) turned off by virtue of the −V volts level applied to its gate lead; that is, the gate-to-source voltage $V_{gs}=0$ volt. Also at this time, the N-MOS device 22 (and also devices 22') has its conduction path either conditioned or not conditioned for current flow in accordance with the voltage level on sense lead 14. If the voltage level on sense lead 14 is 0 volt, the N-MOS device 22 is conditioned to be turned on when the associated device 18 is selected. On the other hand, if the voltage level on sense lead 14 is −V volts, N-MOS device 22 will not turn on when the device 18 is selected. The sense amplifier 29 then responds to the open or closed circuit, as the case may be, provided by N-MOS devices 18 and 22, to provide an output signal having one value for the open circuit condition and another value for the closed circuit condition.

When the strobe signal is applied to decoder 12 and the address signal is such as to select solid lead 16, the voltage level of selection line 16 begins to change from −V volts toward 0 volts after the previously mentioned switching delay, occasioned by the turn-on of the decoder switching devices. The N-MOS device 18 turns on after another delay equal to the time required to change (or discharge) the −V volts level to a value which is more positive than the −V volts value of voltage source 26 by the threshold voltage $V_{thN}$ of the N-MOS device ($V_{gs}<-V+V_{thN}$). Thus, two switching or turn-on delays are required before the output signal of the sense amplifier 29 is valid.

It is to be noted at this point that the prior art information storage system in FIG. 1 requires, in addition to the storage element and the address decoder, two switching devices (such as N-MOS devices 18 and 22) for each stored bit of information.

Referring now to FIG. 2, an embodiment of the present invention is shown which requires only one active device in addition to a decoder, and wherein an output utilization signal is valid after a delay occasioned only by the turn-on of the decoder switching devices. The storage system in FIG. 2 includes $m$ levels of field effect devices as indicated along the bottom of the figure. The device in the $m$th level constitute the storage elements, and the devices in the first through the m−1th level constitute the decoding devices. The number of devices per level increases by a factor of 2 from the first level through the $m-1$th level. The number of devices in the $m-1$th level is equal to the number of devices in the $m$th level. The number $m$ is an integer and has been selected as 4, though not limited thereto, for the purposes of illustration. For $m=4$, the number of devices or storage elements in the fourth level is equal to 8.

A branch circuit means includes a number of branch paths equal to the number of storage elements or devices in the fourth level for selectively coupling the conduction paths of only one of the devices in each level between a common connector means 90 and a sense connector means 91 by way of the conduction path of a strobe or enable P-MOS device 80*a*. For example, the lowermost branch path includes the conduction paths of P-MOS devices 40*a*, 50*a*, 60*a*, 70*a* and 80*a*. The next higher branch path includes the conduction paths of P-MOS devices 40*b*, 50*b*, 60*a*, 70*a* and 80*a*, and so on. Thus, the strobe or enable P-MOS device 80*a* is common to all eight branch paths. The first level devices 70*a* and 70*b* are each common to four branch paths. The second level devices 60*a* . . . 60*d* are each common to two branch paths. Each of the third level devices 50*a* . . . 50*h* and each of the fourth level devices 40*a* . . . 40*h* are located in separate ones of the branch paths.

Beginning with the strobe device 80*a*, the P-MOS devices in each level except the fourth have their source lead connected to the drain leads of the next higher level devices in common branch paths. Thus, strobe device 80*a* has its source lead 82*a* connected to the drain lead 71*a* and 71*b* of first level devices 70*a* and 70*b*. The first level device 70*a* in turn has its source lead 72*a* connected to drain lead 61*a* and 61*b* of second level devices 60*a* and 60*b*, and so on. The fourth level devices 40*a* . . . 40*h* have their source leads 42*a* . . . 42*h* connected to the common connector 90. Finally, the strobe device 80*a* has its drain lead 81*a* connected to the sense connector 91.

A voltage source 92 has its positive lead 93 connected to the common connector 90 and its negative lead 94 connected to circuit ground. The sense connector 91 is connected to a current or low voltage type sense amplifier 95. The sense amplifier 95 may suitably take the form of a PNP bipolar transistor 96 which has its emitter lead 97 connected to the sense connector lead 91 and its collector lead 98 connected to an output lead 100. The collector lead 98 is also connected by way of a collector resistor 101 to the negative lead 102 of a source 103 of collector supply voltage. The source 103 has its positive lead 104 connected to circuit ground. The transistor base lead 99 is connected by way of a base resistor 105 to the negative lead 106 of a source 107 of base bias voltage. The source 107 has its positive lead 108 connected to circuit ground. The transistor base lead 99 is further connected by way of a diode 109 to circuit ground. The diode 109 is connected to conduct current in a direction which is opposite to the direction of normal current flow through the base-emitter junction of transistor 96. The sources 92, 103 and 107 may be any suitable sources of D.C. operating potentials such as batteries in combination with divider arrangement having appropriate taps thereon. In the description which follows, sources 92, 103 and 107 have values of $V_0$, $V_{cc}$ and $V_b$ volts, respectively, as designated on the drawing.

Each of the decoder P-MOS devices in the first through the $m-1$th or third levels has a gate lead to which address decoding signals are applied. In particular, the gate leads 73*a* and 73*b* of first level devices 70*a* and 70*b* receive address signals $\overline{C}$ and C, respectively, where $\overline{C}$ is the binary complement of the signal C. In like manner, the gates of half the devices in the second level, namely, gate leads 60*b* and 60*d* receive address signals B and the other half receive the complement signals $\overline{B}$. Similarly, the gates of half the devices in the third level, namely, gate leads 53*b*, 53*d*, 53*f*, and 53*h*, receive address A and the other half receive the complement signals $\overline{A}$.

The address signals may be supplied, for example, by a data register 110 having three bistable stages. The output signals appearing at the (0) and (1) address output connectors of a stage are the binary complements of one another. Thus, when the output signal A of the 2° stage is a signal or level representing binary "0," the other output signal $\overline{A}$ is a signal or level representing a binary "1," and vice versa. The output or address connectors of the various stages of register 110 are applied at the like designated points in the first through the third levels; the connections are omitted for clarity of the drawing. By way of example, the $\overline{B}$ output of the $2^1$ stage is applied at the gate leads 63*a* and 63*c* of second level P-MOS devices 60*a* and 60*c*. For reasons which will become apparent, the register 110 preferably is one providing outputs of either $+V_0$ volts or "0" volt, corresponding respectively to binary "1" and "0."

The strobe device 80*a* has a gate lead 83*a* to which a strobe or enable signal $S_t$ is applied when it is desired to read the fifth level memory devices. The strobe signal $S_t$ normally has a value of $+V_0$ volts and is changed to 0 volt when the memory address has been inserted into the decoder. The strobe signal may be supplied by any suitable switching circuit.

Each of the gate leads 43*a* . . . 43*h* of the fourth level devices 40*a* . . . 40*h* is connected to a separate one of the information connectors 44*a* . . . 44*h*. The information connectors couple the fourth level leads either to $+V_0$ volts or to 0 volt (ground), indicative of binary "1" and binary "0," respectively, in accordance with the binary value of the bit to be stored. As illustrated in FIG. 2, information connectors 44*a*, 44*c*, 44*f*, and 44*g* couple gate leads 43*a*, 43*c*, 43*f*, and 43*g*, respectively, to the common connector 90, whereby each of the devices 40*a*, 40*c*, 40*f*, and 40*g* is storing a binary one. On the other hand, information connectors 44*b*, 44*d*, 44*e* and 44*h* couple gate leads 43*b*, 43*d*, 43*e*, and 43*h*, respectively, to circuit ground, whereby devices 40*b*, 40*d*, 40*e* and 40*h* are storing binary zeros.

The P-MOS device in FIG. 2 are operable in much the same manner as switches to provide either an open or closed path to current flow. In particular, if a P-MOS device has a source voltage of $+V_0$ volts and a gate voltage of $+V_0$ volts ($V_{gs}=0$ volt), the device is turned off. The conduction path of a turned off device has a relatively high impedance and, therefore, presents an open circuit. On the other hand, if the source voltage is $+V_0$ volts and the gate voltage is 0 volt ($V_{gs}=-V_0$ volts), the P-MOS device is turned on. The conduction path of a turned on device has a relatively low impedance and, therefore, presents a closed circuit.

Consider, now, the operation of the FIG. 2 storage system. The address signals select only one of the eight branch paths at a time for connection to the sense amplifier 95 via the strobe device 80*a*. That is, when the strobe signal $S_t$ has its enabling value of 0 volt, the register 110 outputs are so connected to the gate leads of the decording devices that only the decoding P-MOS devices in one of the branch paths will all have a gate voltage of 0 volt. If the corresponding fourth level memory device also has a gate voltage of 0 volt, all the P-MOS devices in the selected branch path will be turned on. Current will then flow from the positive lead 93 of source 92 through the low impedance of the selected branch path to the sense amplifier 95. On the other hand, if the corresponding fourth level memory device in the selected branch path has a gate voltage of $+V_0$ volts, all of the P-MOS devices in the selected branch paths, will be turned off. That is, all of the P-MOS devices in the selected branch paths will have a $V_{gs}$ of 0 volt. Thus, the selected branch path will have a high impedance and substantially no current will flow therethrough.

By way of example, take the condition where either of the two topmost branch paths is selected. To select the topmost branch path, the address signals A, B and C are all 0 volt. The gate lead 43*h* of the corresponding fourth level memory device 40*h* also has a gate voltage of 0 volt by virtue of its connection to circuit ground. All of the P-MOS devices 40*h*, 50*h*, 60*d* and 70*b* in the topmost branch are turned on and each device operates in a common source mode to translate its source voltage of $V_0$ volts to its respective drain lead. When the strobe signal $S_t$ is changed from $+V_0$ volts to 0 volt, P-MOS device 80*a* turns on. Current now flows from the positive lead 93 of the source 92 through the low impedance of the selected topmost branch path and through the conduction path of the strobe device 80*a* to the sense amplifier 95. This current flow condition is indicative of a fourth level memory device storing a binary 0.

For the condition where the second branch path from the top is selected, the address signals $\overline{A}$, B and C are 0 volt. The gate lead 43*g* of the corresponding fourth level memory device 40*g*, however, has a gate voltage of $+V_0$ volts by virtue of its connection to the common connector 90. Consequently, $V_{gs}=0$ volt for each of the devices 40*g*, 50*g*, 60*g* and 70*b* whereby all of the devices are turned off. When the strobe signal $S_t$ changes to 0 volt, there is no current flow because the selected branch path has a high impedance. The no current flow condition is indicative of the selected fourth level memory device storing a binary "1."

In the sense amplifier the PNP transistor 96 is normally biased to the threshold of conduction so that it responds to relatively small surrent flow through a selected low impedance branch path to turn on. For this purpose, diode 109 is connected between base lead 99 and ground. In the absence of a low impedance branch path, current flows from ground through diode 109 and resistor 105 to the negative lead 106 of the $V_b$ source 107, thereby establishing a base voltage which is only a diode voltage drop (about 0.8 volt for a silicon diode) more negative than ground or 0 volt. Thus, when the strobe signal value is $+V_0$ volts or when the selected fourth level memory device is storing a binary "1" (the above-described no current flow condition), the transistor 96 has substantially no collector current. The output voltage on output lead 100 is therefore substantially $-V_{cc}$ volts. On the other hand, when the strobe signal $S_t$ has a value of 0 volt and the selected memory device is storing a binary 0 (current flow condition), transistor 96 becomes conductive and the output voltage at lead 100 rises to a value which is substantially more positive than $-V_{cc}$ volts. The sense amplifier 95 then provides a positive going output signal from a base line of $-V_{cc}$ volts in response to the addressing of a stored binary 0 (current flow condition) and provides no change in output signal condition in response to the addressing of a stored binary 1 (no curent flow condition).

Several features of the FIG. 2 information system are noteworthy. First, there is only one switching or turn-on delay associated with the read-out of information. The only turn-on delay is caused by the turn-on of the first level strobe device 80*a* and the decoding devices in the second, third and fourth levels.

Another feature is that only $3n-2$ devices are required for storing and decoding *n* bits. Thus, for the FIG. 2 example, only 22 P-MOS devices are required in addition to the strobe device 80*a*.

The device count of $3n-2$ is especially significant when integrated circuit techniques are employed to construct the information system. With less components per bit than, for example, the FIG. 1 prior art system, the information system of the present invention requires less substrate area. The manufacturing yield can be increased and more of the system can be fabricated in or on the same substrate.

When the information system is fabricated as an integrated circuit structure, the techniques of the aforementioned Tuska patent may be employed. For example, the sources 42*a* . . . 42*h* of fifth level devices 40*a* . . . 40*h* and common connector 90 may be a single diffused P-region in an N-type substrate of silicon material. Similarly, the source connection of one P-MOS to the drain of one or more other P-MOS devices may be represented by a single P diffused region serving as the source of one device and as the drain(s) of the other device(s). As employed in the present description and the claims appended hereto, the use of separately identified connectors, such as 90 and 91, and separately identified source or drain leads is intended to also be descriptive of such fabrication expedients where a single diffused region serves not only a connecting function but also a source or drain function of one or more IGFET devices.

Still another feature is that the PNP transistor 96, diode 109, resistor 101 and resistor 105 may be fabricated in or on the same chip or substrate as the *m* levels of P-MOS devices. For example, transistor 96 could be fabricated in an N-type silicon substrate by providing overlying diffusions of P, N and P type materials to form the collector, base and emitter regions, respectively. The diode 109 can be formed, for example, as a PNP transistor having its base and collector regions connected together.

It is further noted at this point that the FIG. 2 embodiment can serve as a building block for forming various memory organizations. For example, a word type memory could be constructed by employing as many of the FIG. 2 arrays as the number of bits required. Thus, a 64 word memory with 8 bits per word could be constructed with 8 arrays like the FIG. 2 memory array.

The FIG. 2 example of the invention is sometimes called a semi-permanent or wired memory in that information is inserted or written by making wired connections which represent the binary value of the stored bit. Such memories find use, for example, as read-only memories (ROM'S) in stored program computers and other equipments. However, the invention is also applicable to other applications where it is desirable to have the capability of readily changing the informational content of the system.

Figure 3:
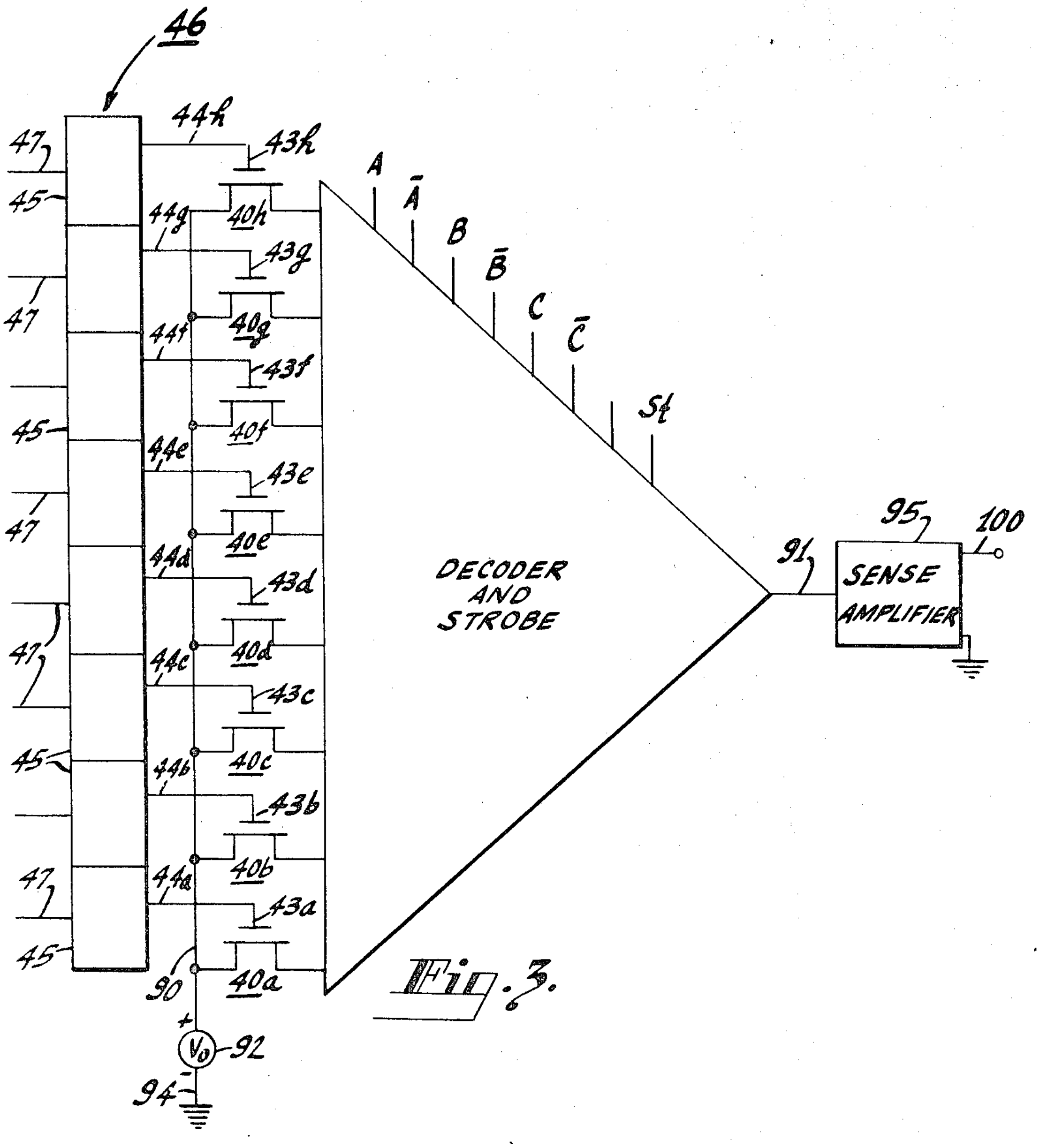
FIG. 3 is in part a block diagram and, in part, a circuit schematic illustrating other embodiments of a memory system in accordance with the present invention.

According to further embodiments of the invention, the *m*th or fourth level P-MOS devices have their gate leads connected to receive via bit sense lines the binary "0" and "1" voltage levels from an array of storage elements into which information can readily be inserted in any suitable manner. An example of these embodiments is illustrated in FIG. 3 where the strobe and decoding levels, and the sense amplifier are represented in block form for the sake of clarity on the drawing. The fourth level devices 40*a* . . . 40*h* have their gate leads 43*a* . . . 43*h* connected via separate ones of the information connectors or bit sense lines 44*a* . . . 44*h* which sense the binary values of bits stored in binary storage elements 45 of a memory array 46. In keeping with the operational description of the FIG. 2 embodiment, the binary storage elements 45 are considered to be of a type which provide output voltage levels of either $+V_0$ volts or "0" volt, representative of the binary digits "1" and "0," respectively. For example, the binary storage elements 45 could be flip-flops each constructed of a pair of cross-coupled inverters which include either IGFETS of one conductivity type or of complementary conductivity types. The storage elements 45 may be written into via write connectors 47 by any means (not shown) which is suitable to change the binary conditions of the storage elements 45. The array 46 may be of any suitable memory organization. For example, the storage elements 45 could be arranged in rows and columns. On the other hand, the storage elements 45 of array 46 could be simply a data register. The operation of the FIG. 3 storage system is similar to the FIG. 2 system except that the binary values of the stored bits are selectively changeable in FIG. 3.

Thus, there has been described examples of information storage systems which require only $3n-2$ switching devices for selecting one out of *n* bits of storage for read-out. During read-out there is only one circuit delay associated with the turn-on of the address and strobe devices.

What is claimed is:

1. In combination:

a group of *n* storage elements, where *n* is an integer, each such element comprising a device having a conduction path, a control terminal for controlling the conductivity of said path, two terminals, one at each end of the conduction path, and means coupled to said control electrode for placing the conduction path in a high or low impedance condition to represent storage of one of the two values of a binary digit;

an output terminal at which the stored binary data may be sensed;

a decoder comprising $n$ transmission paths, one per storage element, each path connected between one terminal of its storage element and said output terminal, each such transmission path comprising the series connected conduction paths of a plurality of devices and further including a control electrode for each device for controlling the conductivity of the conduction path of that device;

means for placing a desired one of said transmission paths in a relatively low impedance condition and the remaining paths in a high impedance condition comprising means for applying control signals to said control electrodes of the devices of said decoder; and a source of current coupled between, on the one hand, the second terminal of all of said storage elements and, on the other hand, said output terminal.

2. In the combination as set forth in claim 1, further including the conduction path of another device coupling said source of current to said output terminal, said device having a control electrode for controlling the conductivity of its path, and including also means for strobing said control electrode for reducing the impedance of said conduction path when it is desired to read one of said storage elements.

3. In combination:

an array of $n$ storage devices, where $n$ is an integer, each such device comprising an MOS device having a conduction path and at each end thereof a terminal, and a control terminal for controlling the conductivity of the path, said control terminal being responsive to a signal representing a bit of binary data for placing the path in a high or low impedance condition to represent storage of one of the two values of a binary digit;

a current source having two terminals and means for connecting one terminal of each of said $n$ storage devices to one terminal of said source;

a decoder circuit having $n$ branch paths, one per storage device, each such branch path comprising a plurality of MOS devices each having a conduction path and a control terminal for controlling the conductivity of the conduction path, the conduction paths of the devices in a branch path being connected in series with one another and means for connecting each branch path to the other terminal of a storage device;

means for selectively applying decoding signals to the control terminals of each decoder MOS device in said $n$ branch paths for reading one of the $n$ bits of data at a time, the signals applied to the branch path connected in series with the device storing the bit of data selected, being of the sense to render all of the devices in the branch path selected highly conductive and at least one of the devices in each of the unselected branch paths nonconductive;

an output terminal; and another MOS device having a conduction path and means for connecting one end of said path to said output terminal and a control terminal for controlling the conductivity of the conduction path, said control terminal being responsive to a strobe pulse for making the conduction path highly conductive, and means connected to the other end of the conduction path of said last-named MOS device for sensing the selected bit of data when a strobe pulse is applied to said last-named MOS device.

4. The combination claimed in claim 3, including means for connecting the other terminal of said current source to said output terminal.

5. The combination claimed in claim 3, said means for connecting comprising a transistor having a base, emitter, and collector electrode, the emitter-collector path being connected between said last-named MOS device and said output terminal and including means connected to the base electrode for maintaining said transistor nonconductive in response to the sensing of a bit of one binary value and conductive in response to a bit of the other binary value.

References Cited

UNITED STATES PATENTS

| | | | |
|---|---|---|---|
| 3,355,598 | 11/1967 | Tuska | 307—304 |
| 3,383,663 | 5/1968 | David | 340—173 |

OTHER REFERENCES

Gurski: Field Effect Transistor Read-Only Storage Unit, IBM Technical Disclosure Bulletin, vol. 7, No. 11, April 1965, pp. 1107–8.

TERRELL W. FEARS, Primary Examiner

U.S. Cl. X.R.

307—244; 340—166